US009475644B2

(12) United States Patent
O'Neill

(10) Patent No.: US 9,475,644 B2
(45) Date of Patent: Oct. 25, 2016

(54) SOUND DAMPENING CONVEYOR CHAIN FLIGHT

(71) Applicant: Joy MM Delaware, Inc., Wilmington, DE (US)

(72) Inventor: Michael L. O'Neill, Lucinda, PA (US)

(73) Assignee: Joy MM Deleware, Inc., Wilmington, DE (US)

( * ) Notice: Subject to any disclaimer, the term of this patent is extended or adjusted under 35 U.S.C. 154(b) by 0 days.

(21) Appl. No.: 14/624,749

(22) Filed: Feb. 18, 2015

(65) Prior Publication Data

US 2015/0158675 A1   Jun. 11, 2015

Related U.S. Application Data

(63) Continuation of application No. 13/220,048, filed on Aug. 29, 2011, now Pat. No. 8,978,877, which is a continuation-in-part of application No. 12/433,332, filed on Apr. 30, 2009, now Pat. No. 8,141,696.

(51) Int. Cl.
*B65G 19/24*   (2006.01)
*B65G 19/08*   (2006.01)

(52) U.S. Cl.
CPC ............... *B65G 19/24* (2013.01); *B65G 19/08* (2013.01); *B65G 2207/32* (2013.01); *Y10T 29/49885* (2015.01)

(58) Field of Classification Search
CPC .............................. B65G 19/24; B65G 19/16
USPC ............... 198/728, 729, 730, 734, 850, 852; 474/228
See application file for complete search history.

(56) References Cited

U.S. PATENT DOCUMENTS

| 231,186 | A | * | 8/1880 | Neacy | ........................... 198/618 |
| 708,924 | A | * | 9/1902 | Scott et al. | ............ B65G 19/08 198/731 |
| 1,008,890 | A | * | 11/1911 | Demarest | ............... B65G 19/08 198/733 |
| 1,020,863 | A | * | 3/1912 | Weichseldorfer | ...... B65G 19/24 198/731 |
| 1,153,375 | A | * | 9/1915 | Elliott | .................... B65G 19/08 198/733 |
| 1,427,229 | A | * | 8/1922 | Robbins | ................. B65G 19/08 198/733 |

(Continued)

FOREIGN PATENT DOCUMENTS

| CN | 1044627 A | 8/1990 |
| CN | 201087012 Y | 7/2008 |

(Continued)

OTHER PUBLICATIONS

1st Office Action from the State Intellectual Property Office of the People's Republic of China for Application No. 201210313652.1 dated Jun. 23, 2015 with English translation (18 pages).

(Continued)

*Primary Examiner* — Joseph Dillon, Jr.
(74) *Attorney, Agent, or Firm* — Michael Best & Friedrich LLP

(57) ABSTRACT

A conveyor flight for a chain comprising at least two spaced apart links, and two side plates that connect the links, with each side plate including two spaced apart extension pins extending from the side plate. The flight comprises a metal support, and the metal support includes two spaced apart cylindrical portions adapted to receive the two spaced apart extension pins. The flight also includes a flexible casing surrounding the metal support.

17 Claims, 8 Drawing Sheets

(56) References Cited

U.S. PATENT DOCUMENTS

| | | | | |
|---|---|---|---|---|
| 2,754,957 | A | * | 7/1956 | Dodson .................. B65G 19/08 198/731 |
| 2,761,548 | A | * | 9/1956 | Long ...................... B65G 19/08 198/733 |
| 3,103,275 | A | * | 9/1963 | Rollins .................. B65G 19/08 198/731 |
| 3,225,897 | A | * | 12/1965 | Rollins .................. B65G 19/08 198/734 |
| 3,324,990 | A | * | 6/1967 | Karlovsky, Jr. ........ B65G 19/08 198/733 |
| 3,452,228 | A | * | 6/1969 | Woolley ................. H02K 7/116 310/134 |
| 3,602,364 | A | | 8/1971 | Maglio et al. |
| 4,238,028 | A | | 12/1980 | Lake |
| 4,585,117 | A | | 4/1986 | Hahn |
| 4,766,995 | A | | 8/1988 | Sterwerf, Jr. |
| 4,899,868 | A | | 2/1990 | Johnson |
| 5,000,310 | A | | 3/1991 | Edmondson |
| 5,056,651 | A | | 10/1991 | Nagamatsu |
| 5,186,526 | A | | 2/1993 | Pennington |
| 6,662,932 | B1 | | 12/2003 | O'Neill |
| 7,036,657 | B1 | | 5/2006 | Robinson |
| 7,118,648 | B2 | | 10/2006 | Dever et al. |
| 7,438,180 | B1 | | 10/2008 | Taylor et al. |
| 7,997,402 | B2 | | 8/2011 | Merten et al. |
| 8,141,696 | B2 | | 3/2012 | O'Neill |
| 8,177,049 | B2 | | 5/2012 | O'Neill |
| 8,453,826 | B2 | | 6/2013 | Morris |
| 2004/0140182 | A1 | | 7/2004 | Morris |
| 2005/0176539 | A1 | | 8/2005 | Hirschmann |
| 2005/0274590 | A1 | | 12/2005 | Kwiat |
| 2009/0218199 | A1 | * | 9/2009 | Russell ................ B65G 17/086 198/841 |
| 2010/0276254 | A1 | | 11/2010 | O'Neill |
| 2013/0203539 | A1 | * | 8/2013 | Kirchner ............... C22C 38/002 474/228 |
| 2013/0284569 | A1 | * | 10/2013 | Studer .................. B65G 17/066 198/850 |
| 2013/0334015 | A1 | * | 12/2013 | Lasecki ................ B65G 17/083 198/851 |
| 2015/0101912 | A1 | * | 4/2015 | Morris .................. B65G 19/08 198/731 |

FOREIGN PATENT DOCUMENTS

| | | |
|---|---|---|
| CN | 101602433 A | 12/2009 |
| DE | 3151059 | 7/1983 |
| DE | 19633298 | 2/1998 |
| EP | 2147875 | 1/2010 |
| GB | 658623 | 10/1951 |
| RU | 2064393 C1 | 7/1996 |
| WO | 9008716 A1 | 8/1990 |
| WO | 03013987 | 2/2003 |

OTHER PUBLICATIONS

2nd Office Action with English translation from the State Intellectual Property Office of the People's Republic of China for Application No. 201210313652.1 dated Mar. 4, 2016 (11 pages).

Office Action with English translation from the Patent Office of the Russian Federation for Application No. 2012137305 dated Feb. 17, 2016 (8 pages).

Australian Patent Examination Report No. 1 for Australian Application No. 2012216444 dated Oct. 9, 2013 (3 pages).

CN201010171300.8 First Office Action dated Aug. 20, 2013 (10 pages).

Search Report from the Polish Patent Office for Application No. P.400532 dated Dec. 21, 2012 (2 pages).

Search Report from the United Kingdom Intellectual Property Office for Application No. 1215225.2 dated Dec. 12, 2012 (4 pages).

Bureau of Mines United States Department of the Interior, "Noise Study of Longwall Mining Systems", Jan. 1986, Contract JO188072, Wyole Laboratories, cover page, p. 3, pp. 131-137 (9 pages).

* cited by examiner

SOUND DAMPENING CONVEYOR CHAIN FLIGHT

CROSS-REFERENCE TO RELATED APPLICATIONS

The present application is a continuation of prior-filed, co-pending U.S. application Ser. No. 13/220,048, filed Aug. 29, 2011, which is a continuation-in-part of prior-filed, co-pending U.S. application Ser. No. 12/433,332, filed Apr. 30, 2009. The entire contents of both of these documents are hereby incorporated by reference.

FIELD

The present invention relates to a chain and flight conveyor for use in conveying material in the mining industry and, in particular, to an improved design of a chain and flight conveyor. Still more particularly, this invention relates to conveyor chains for continuous miners and chain haulage units.

SUMMARY

Conveyor flights with various coatings have been attempted in the past. The primary reason for these coatings was for noise control. While the coatings have been shown to reduce conveyor noise by 5-10 dBA, these materials wore off of the flights relatively quickly and were determined not to be of sufficient value for commercial use on continuous miners or longwall equipment. The coatings compressed beyond their working limit and began to tear and chuck out. One of the reasons for this failure is that the coating was too thin. There is a limited amount of space available on the conveyor for the flight bars, so in order to make the coating thicker, the integrity of the existing flight is compromised.

Urethane coating on conveyor chain flights has proven effective in reducing the noise exposure of continuous miner operators. Problems preventing widespread acceptance of this solution include the cost of implementation and maintenance of the chain, the durability of the urethane coating, etc.

The most successful urethane-coated flight design to date is a standard forged steel conveyor flight, which is machined down to reduce its thickness and thus allow room for the urethane coating. The machined-down flight is then used as a flight core, which is encapsulated in the urethane coating. However, the coating is thinner than desired, and the corners of the steel flight cause stress concentration on the urethane coating. The end of the flight nearest the chain is currently enlarged and has holes to fit the chain pins. The urethane coating is undesirably thin due to the enlarged end of the flight.

The flight core is welded integrally to the chain flight section, which is a part of the chain assembly. Replacing a flight due to loss of the urethane coating is expensive and difficult. If more than a few flights have lost their urethane coating, it is not economical to repair the chain, and the entire chain must be replaced.

An independent object of this disclosure is to provide a conveyor chain having replaceable urethane-coated flights. With a conveyor chain having replaceable urethane-coated flights, it is then possible to replace damaged urethane coated flights in a few minutes with minimum downtime of the continuous miner.

In one independent embodiment, a conveyor flight for a chain includes at least two spaced apart links, and two side plates that connect the links, with each side plate including two spaced apart extension pins extending from the side plate. The flight may include a metal support, and the metal support may include two spaced apart cylindrical portions adapted to receive the two spaced apart extension pins. The flight may also include a flexible casing surrounding the metal support.

In another independent embodiment, a flight is provided for a chain flight assembly of a conveyor chain, the chain flight assembly including a pair of parallel flight pins spaced apart by a distance, each pin having a length, a pair of spaced apart, parallel side plates mounted on the pins, and at least one flight. The flight may generally include a flight core including an arm and a pair of parallel tubes spaced apart by the distance, the arm being between and coupled to each tube, each tube having a first end and a second end, and a flight coating encapsulating and secured to the core, the coating including a first end and a second end, the first end including a pair of openings. The core and the coating may form a unitary flight, the unitary flight being connectable to the pins, the first end of each tube being adapted to receive a portion of the length of an associated pin, each opening in the coating being adapted to receive therethrough a portion of the associated pin.

In a further independent embodiment, a chain flight assembly of a conveyor chain is provided. The assembly may generally include a pair of parallel flight pins spaced apart by a distance, each pin having a length, a pair of spaced apart, parallel side plates mounted on the pins, and at least one removable flight. The flight may include a flight core including an arm and a pair of parallel tubes spaced apart by the distance, the arm being between and coupled to each tube, each tube having a first end and a second end, and a flight coating encapsulating and secured to the core, the coating including a first end and a second end, the first end including a pair of openings. The core and the coating may form a unitary flight, the unitary flight being removably connectable to the pins, the first end of each tube removably receiving a portion of the length of an associated pin, each opening in the coating receiving therethrough a portion of the associated pin.

In yet another independent embodiment, a chain flight assembly of a conveyor chain is provided. The assembly may generally include a pair of parallel flight pins spaced apart by a distance, each pin having an outer surface and a length, a pair of spaced apart, parallel side plates mounted on the pins, at least one removable flight including a pair of openings spaced apart by the distance, each opening having an inner surface and removably receiving an associated pin, and adhesive between the inner surface of each opening and the outer surface of the associated pin to removably connect the flight to the pins.

In another independent embodiment, a method of assembling a chain flight assembly of a conveyor chain is provided. The method may generally include providing a pair of parallel flight pins spaced apart by a distance, each pin having a length, mounting a pair of spaced apart, parallel side plates mounted on the pins, providing at least one flight, the flight including a flight core including an arm and a pair of parallel tubes spaced apart by the distance, the arm being between and coupled to each tube, each tube having a first end and a second end, and a flight coating including a first end and a second end, the first end including a pair of openings, providing including encapsulating the core in the coating to form a unitary flight, and after encapsulating, removably connecting the unitary flight to the pins including removably receiving a portion of the length of an associated pin in the first end of each tube, and removably receiving a portion of the associated pin through each opening in the coating.

Figure 1:
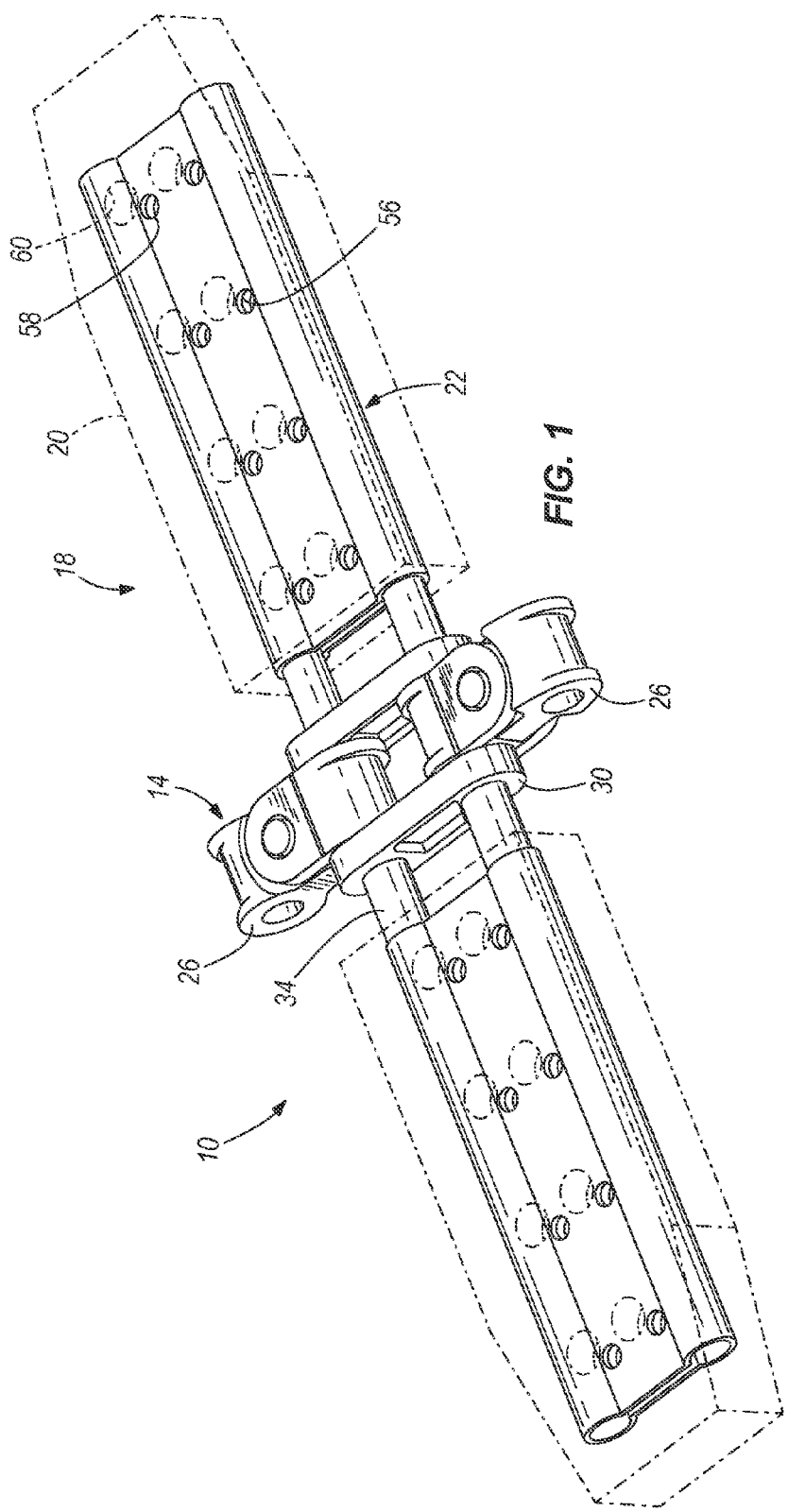
FIG. 1 is a partial perspective view of a conveyor including a chain and flights.

Before any independent embodiments of the disclosure is explained in detail, it is to be understood that the disclosure is not limited in its application to the details of the construction and the arrangements of components set forth in the following description or illustrated in the drawings. The disclosure is capable of other independent embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Further, it is to be understood that such terms as "forward", "rearward", "left", "right", "upward" and "downward", etc., are words of convenience and are not to be construed as limiting terms.

DETAILED DESCRIPTION

Figure 2:
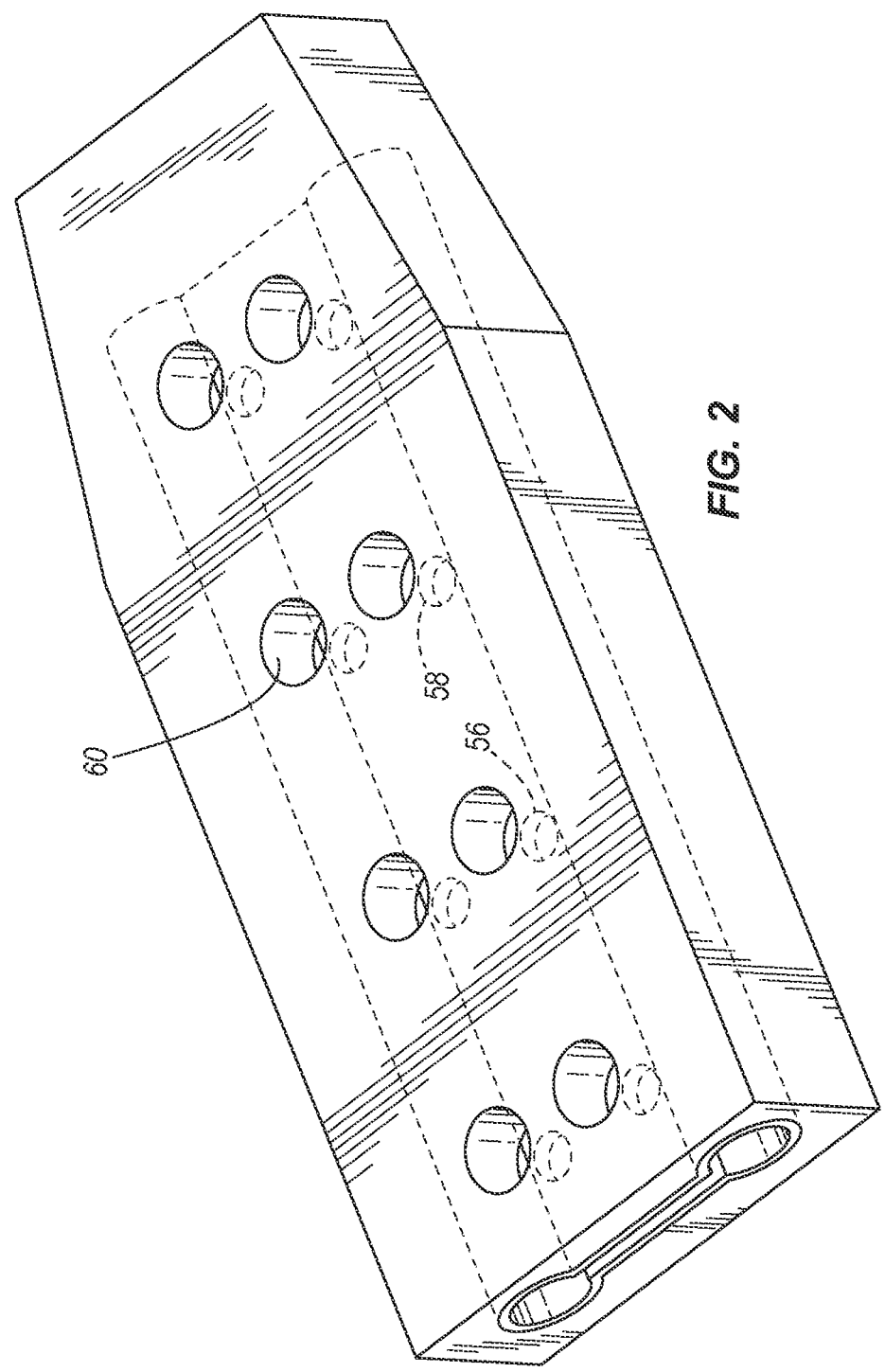
FIG. 2 is a perspective view of one flight including an internal core and an external urethane coating.
Figure 3:
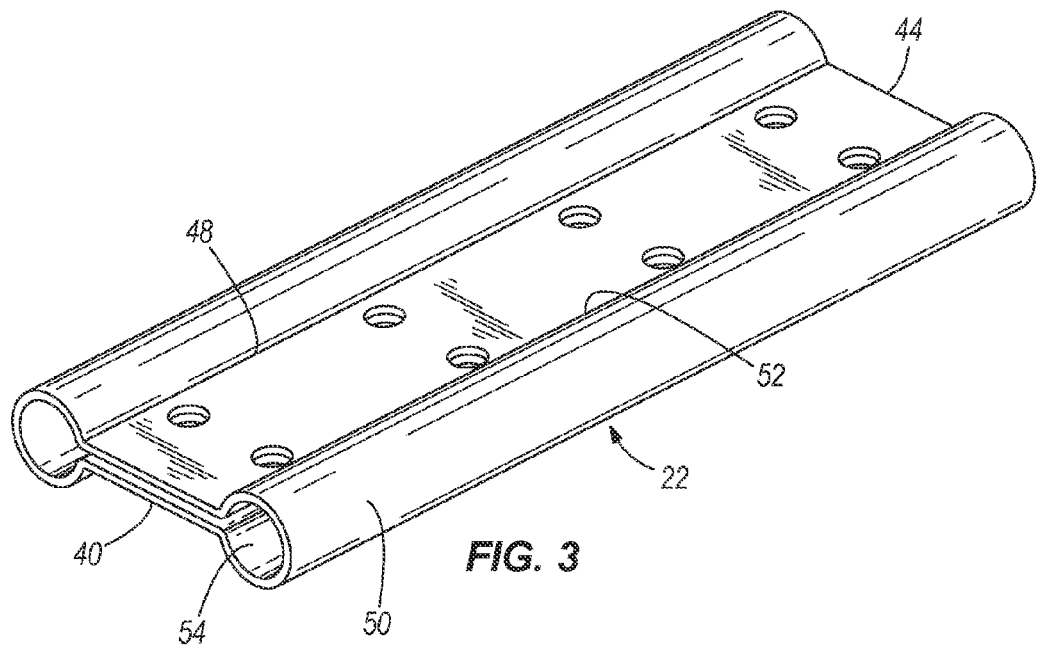
FIG. 3 is a perspective view of the internal core shown in FIG. 2.

A conveyor 10 including a chain 14 and flights 18 is shown in FIG. 1. The flight 18 includes sound dampening material in the form of a urethane coating 20 (FIG. 2), and a metal support 22, in the form of an embedded steel plate core, is shown in FIGS. 1 and 3. In other embodiments, other less preferred forms of a metal support, such as a block (not shown), can be used.

More particularly, the chain 14, as illustrated in FIG. 1, includes two swivel links 26 connected by two side plates 30. Although only two swivel links 26 connected by two side plates 30 are shown, the chain 14 usually is an endless chain (not shown), and flights 18 are attached at spaced apart locations along the chain 14.

Extending perpendicular to the direction of chain travel are two spaced apart pins 34 that extend outwardly from each of the side plates 30. Each of the flights 18 is attached to the spaced apart pins 34, as further explained below. As illustrated in FIG. 1, one set of the two spaced apart pins 34 extend to the left of the chain 14 and one set of the two spaced apart pins 34 extend to the right of the chain 14.

Each flight 18 has the thin-walled steel core 22, leaving space for adequate thickness of the sound-dampening coating 20. The core 22, as shown in FIG. 3, is a flat steel plate having a first end 40 and a second end 44, and a left edge 48 and a right edge 52, as shown in FIG. 3. Each of the left and right edges of the core 22 has a cylindrical portion 50 that defines a cylindrical opening 54 that extends the length of the core 22. The cylindrical openings 54 receive the elongated chain pins 34. The core 22 is clamped onto the flight pins 34 by clamping means in the form of rivets or threaded fasteners 56 (see FIG. 1) that pass through openings 58 that extend only through the metal support 22. The core 22, together with the elongated pins 34, provides strength and rigidity to support the urethane outer shell 20 of the flight 18.

In order to permit access to the rivets or threaded fasteners 56, so that the flight 18 can be removed from the conveyor 10, or so a new flight 18 can replace a damaged one, openings 60 are present in the urethane coating 20 above the openings 58 through the metal support 22.

Figure 4:
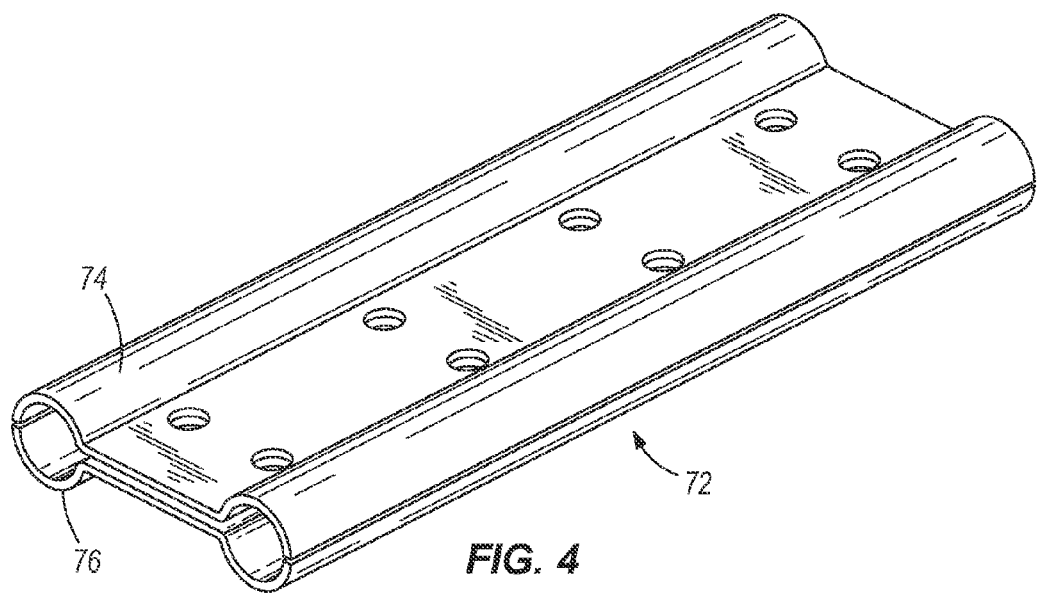
FIG. 4 is a perspective view of an alternate embodiment of the internal core shown in FIG. 3.

In one embodiment, not shown, the sound-dampening flight 18 can be made in multiple pieces that are glued together and onto the cores 22 at the same time. In the preferred embodiment, the flight 18 is molded directly onto the core 22. More particularly, the core 22 is inserted into a mold, and then the sound-dampening material 20 is poured over the core. The core can be one piece or two piece. Shown in FIG. 3 is a one-piece core 22 and shown in FIG. 4 is a core 72 made of two identical pieces 74 and 76, arranged symmetrically. The core can also be made into a single piece by welding two pieces along the edges. The one-piece core provides more reliable clamping onto the chain pins 34, but the two-piece core is be less expensive to manufacture.

Figure 5:
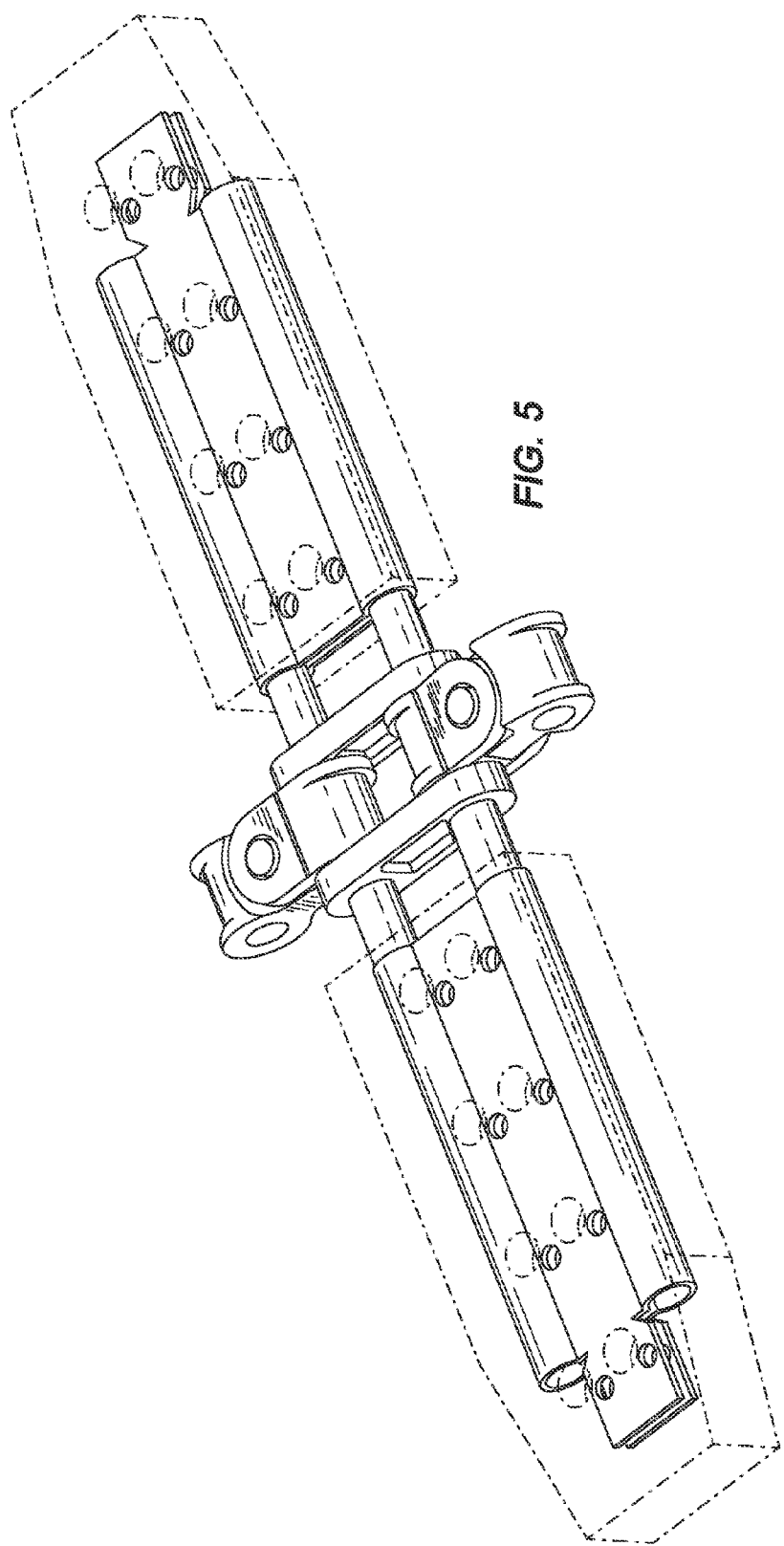
FIG. 5 is a partial perspective view of an alternate embodiment of a conveyor including a chain and flights.

As shown in FIG. 5, the length of the cylindrical openings 54 need not be the entire length of the core 22. When pins 34 that do not extend the entire length of the core 22 are used for economical reasons, the length of the cylindrical openings 54 can be suited to the length of pin extension 34. This also allows various widths of chain assembly to be easily made by simply selecting the flights of the desired width, and keeping the pin length common.

A dual-sprocket conveyor chain from U.S. Pat. No. 6,662,932, which is incorporated herein by reference, is shown in the illustrations. The concept could also be applied to standard single-sprocket conveyor chain. In the illustrations, the urethane flight is shown partially transparent to reveal the flight pins and core within.

Figure 6:
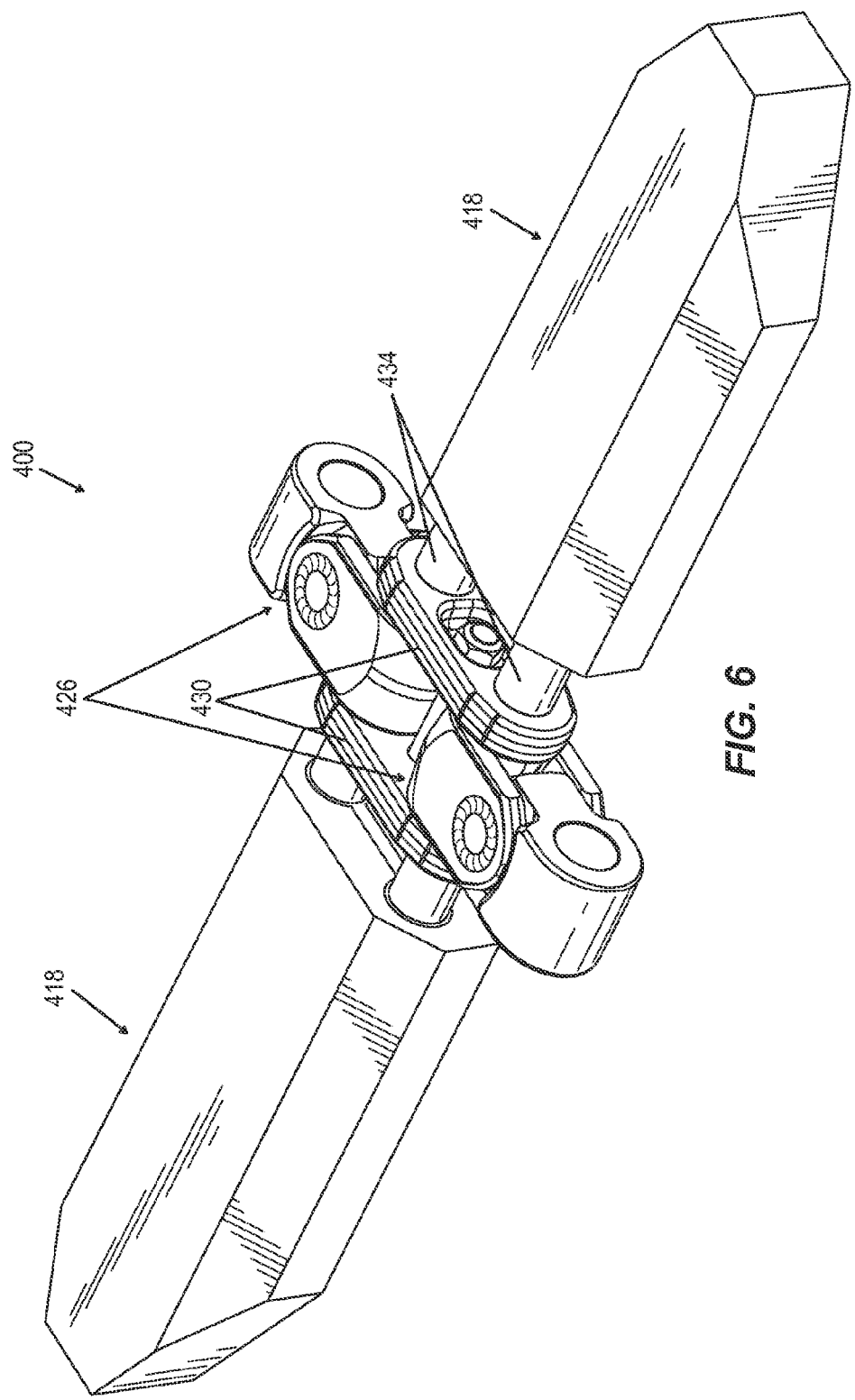
FIG. 6 is a perspective view of an alternative embodiment of a chain flight assembly.
Figure 7:
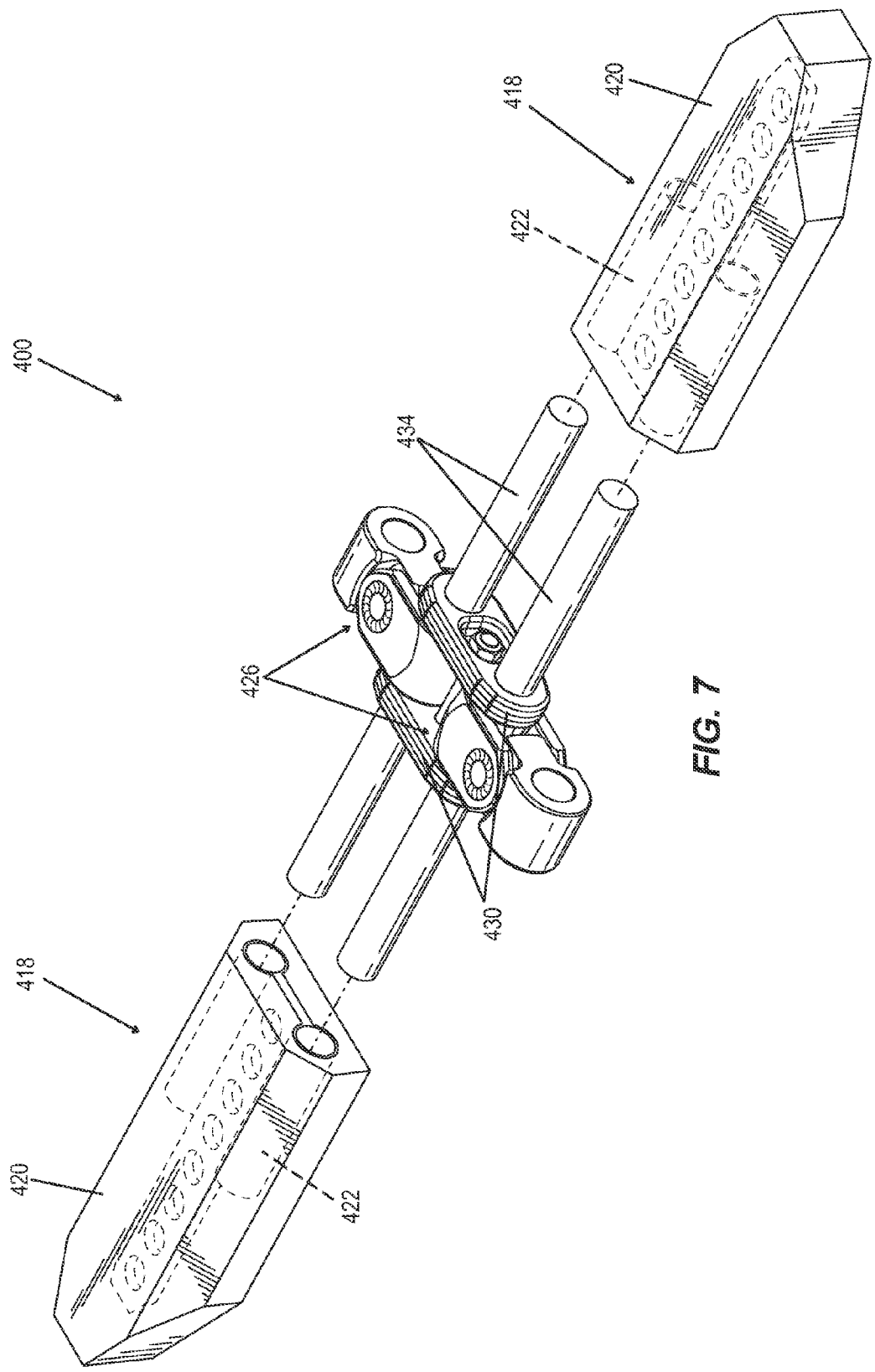
FIG. 7 is an exploded perspective view of the chain flight assembly shown in FIG. 6.

FIGS. 6-9 show a chain flight assembly 400 according to another embodiment of the invention. The chain flight assembly 400 shown in FIGS. 6-7 is similar to the chain flight assembly described above in regard to FIGS. 1-5, and only differences will be discussed herein. Common elements have the same reference number, plus "400".

Figure 8:
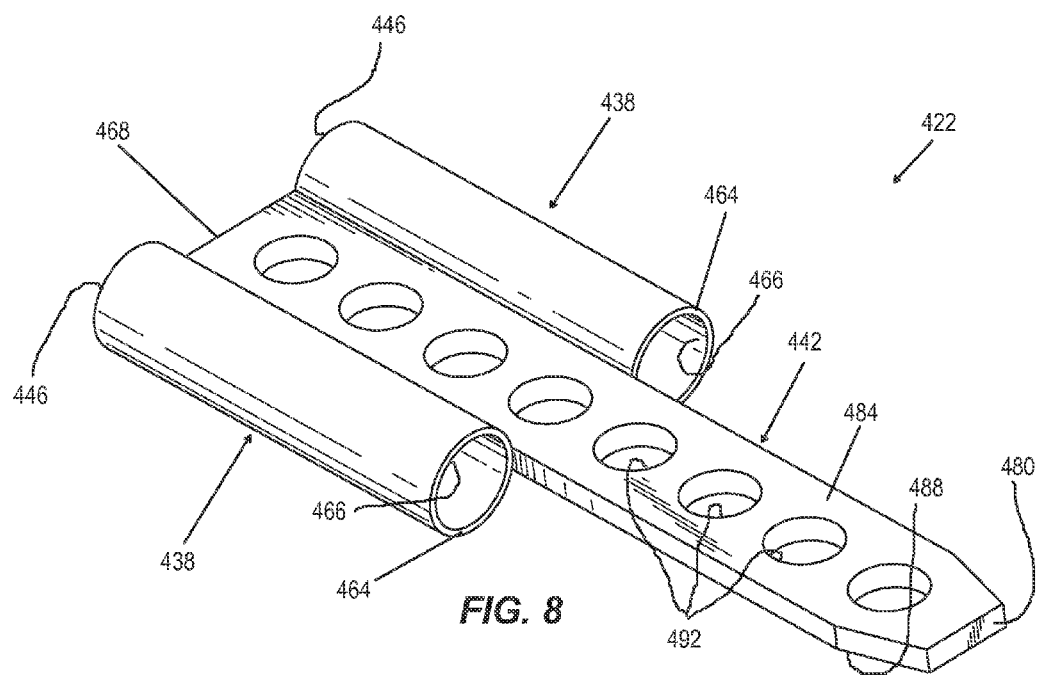
FIG. 8 is a perspective view of a core of the chain flight assembly shown in FIG. 6.

The chain flight assembly 400 includes chain flights 418, swivel links 426, side plates 430, and flight pins 434. As shown in FIGS. 7-8, the chain flight 418 includes a flight coating 420, made from a sound dampening material, such as urethane, and an inner flight core 422 made from a rigid material, such as steel.

FIG. 8 shows the core 422 in greater detail. The illustrated core 422 includes two parallel tubes 438 and an arm 442 coupled to the tubes 438. Each tube 438 includes a first end 446 and a second end 464, and the tubes 438 are spaced apart by a distance equal to the pitch length of the chain 14. The tubes 438 have an inner surface 466 defining an inner diameter. The inner diameter is slightly larger than the diameter of the pins 434 to permit a clearance fit between the tubes 438 and an outer surface of the pins 434.

The arm 442 includes a first end 468 proximate the first ends 446 of the tubes 438, a second end 480, an upper surface 484, and a lower surface 488. The arm 442 extends parallel to the tubes 438 toward the second end 480 that, in the illustrated construction, is beyond the second ends 464 of the tubes 438. The arm 442 also includes multiple openings 492 extending between the upper surface 484 and the lower surface 488. In other embodiments, the arm 442 may include more or fewer openings 492 having various sizes.

Figure 9:
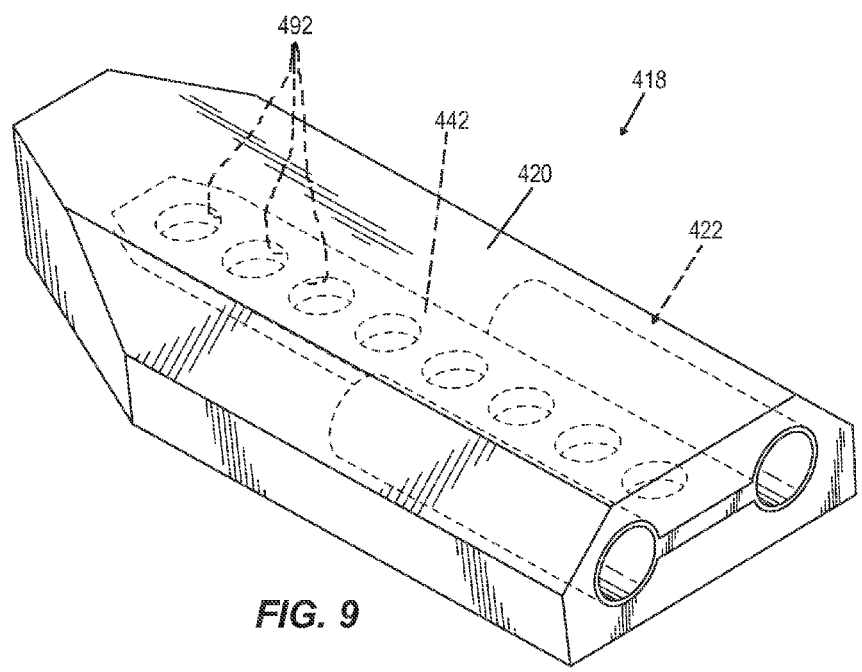
FIG. 9 is a perspective view of an external coating for the chain flight assembly shown in FIG. 6.

The flight coating 420 is made from urethane or another sound dampening material. As shown in FIG. 9, the illustrated coating 420 substantially encapsulates the core 422, covering the upper, lower and outer end surfaces of the core 422. In other constructions, the coating 420 may cover the inner end surface of the core 422. The coating 420 extends through and fills the openings 492 of the arm 442, strengthening the bond between the coating 420 and the arm 442.

Referring again to FIG. 7, the pins 434 have an extended length to attach to the core 422. The flights 418 are connected to the pins 434, and, in the present embodiment, adhesive provides structure to connect the flights 418 and pins 434. To assemble the flight 418 to the chain 14, an adhesive or chocking compound is applied to the inside of the tubes 438 and/or to the pins 434. The pins 434 may be prepared to enhance the adhesive bond, which may include knurling, grooving, or sandblasting the outer surface of the pins 434. The tubes 438 are slid over the pins 434, securing the flight 418 with respect to the chain flight assembly 400. The adhesive fills the space between the inside of the tube 438 and the pin 434.

Suitable adhesives have a shear strength of 5,000 psi, and the tubes 438 and the pins 434 are designed to have an adequate bonding area to provide the requisite strength for the chain flight assembly 400. In addition, the selected adhesive has a melting temperature such that the application of heat causes the adhesive to melt and permits the operator to remove and replace a worn or damaged flight 418. After applying additional adhesive to the pins 434 and/or tubes 438 (if necessary), a new, replacement flight 418 is installed on the pins 434.

The modular design of the flight 418 shown in FIGS. 6-9 simplifies replacement of a broken flight without requiring disconnecting the chain 14 and replacing an entire chain flight assembly 400. The rigid flight core 422 provides strength and rigidity to the flight 418, while the flight coating 420 provides sound dampening to reduce the noise caused by operation of the conveyor 10.

In addition, the flight core 422 and flight coating 420 simplify the manufacturing process by eliminating the need to first attach a flight onto a chain flight assembly and then apply a coating to each flight. Instead, the flights 418 may be produced individually by first manufacturing the flight core 422 and then coating the core 422 in the coating 420. This reduces the cost of forming a chain flight assembly 400 having sound dampening flights 418.

The length of the tubes 438 may be adjusted depending on the desired amount of contact surface between the pins 434 and the tubes 438. Also, the length and shape of the arm 442 may be adjusted depending on the desired strength or rigidity of the flight 418.

Figure 10:
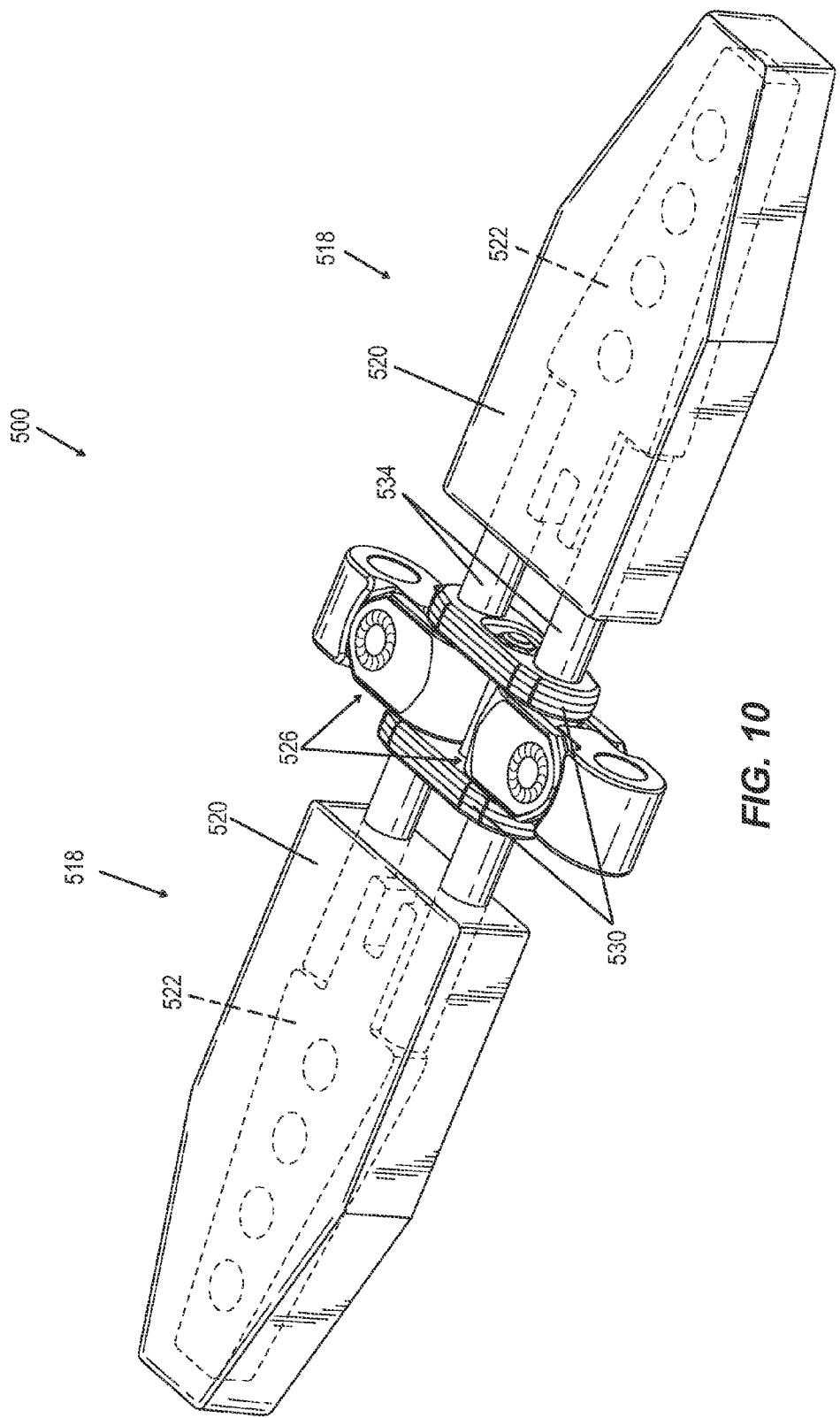
FIG. 10 is a perspective view of another alternative embodiment of the chain flight assembly.

FIG. 10 shows an alternative embodiment of a chain flight assembly 500 including a flight 518 in which the core 522 is connected to (e.g., slid over) the ends of the pins 534. The core 522 extends nearly the entire length of the flight coating 520, providing greater strength to the assembly.

In yet another independent embodiment (not shown), the flight is made from a material having sound dampening properties, such that a separate coating is not required, and with sufficient strength, such that a separate core element is not required. One example of such a suitable material is ductile iron. Although ductile iron is not easily welded to steel, such a flight can be attached to the pins by an adhesive, as described above. Such a flight may have a construction similar to the flight 418 (e.g., with openings for the pins 434 and with generally the same outer shape). Alternatively, the flight may have a construction similar to that shown in U.S. Patent Application Publication No. US 2009/0250318 A1, published Oct. 8, 2009, the entire contents of which is hereby incorporated by reference.

Thus, the invention may generally provide, among other things, a chain flight assembly with sound dampening. One or more independent features and advantages of the invention may be set forth in the following claims.

What is claimed is:

1. A chain link assembly of a conveyor chain, the assembly comprising:
   a pair of parallel flight pins spaced apart by a distance, each pin having an outer surface, a first end, and a second end;
   a pair of spaced apart, parallel side plates mounted on the pins;
   a flight core having a first end and a second end, the first end defining at least one surface secured to the first end of each flight pin and spaced apart from each side plate; and
   a coating encapsulating the flight core and at least a portion of the flight pins proximate the flight core.

2. The chain link assembly of claim 1, wherein the flight core includes a first side and a second side and defines at least one opening extending between the first side and the second side, and wherein material of the coating fills the at least one opening.

3. The chain link assembly of claim 1, wherein the flight core includes a portion positioned between the flight pins and secured to both flight pins.

4. The chain link assembly of claim 1, wherein the second end of the flight core defines a trapezoidal shape.

5. The chain link assembly of claim 1, wherein the flight core defines a core length, and the coating defines a coating length greater than the core length.

6. The chain link assembly of claim 1, wherein the coating has an end that is spaced apart from each side plate.

7. The chain link assembly of claim 1, wherein the flight core is a first flight core and the coating is a first coating, and the chain flight assembly further comprising a
   a second flight core having a first end and a second end, the first end defining at least one surface secured to the second end of each flight pin and spaced apart from each side plate; and
   a second coating fully encapsulating the second flight core and at least a portion of the flight pins proximate the second flight core.

8. The chain link assembly of claim 1, wherein the flight core is removably connected to the flight pins.

9. The chain link assembly of claim 8, wherein the flight core includes a pair of spaced-apart plates and fasteners to clamp the plates together onto the pins, wherein the flight core and the coating define openings for receiving the fasteners.

10. The chain link assembly of claim 8, wherein each pin has an outer surface, wherein the flight core includes a pair of tubes for receiving the first ends of the flight pins, and the chain flight assembly further comprising an adhesive between each tube and the outer surface of each pin.

11. The chain link assembly of claim 1, wherein the flight core has a portion positioned between the flight pins and an end surface facing toward the side plates, the end surface covered by the coating.

12. A chain link assembly of a conveyor chain, the assembly comprising:
- a pair of parallel flight pins spaced apart by a distance, each pin having an outer surface, a first end, and a second end;
- a pair of spaced apart, parallel side plates mounted on the pins;
- a flight core having a first end and a second end, the first end defining at least one surface secured to the first end of each flight pin and spaced apart from each side plate, the flight core having a first side and a second side and defining at least one opening extending between the first side and the second side; and
- a coating encapsulating the flight core and at least a portion of the flight pins proximate the flight core, the coating having an end spaced apart from each side plate, material of the coating filling the at least one opening.

13. The chain link assembly of claim 12, wherein the flight core includes a portion positioned between the flight pins and secured to both flight pins.

14. The chain link assembly of claim 12, wherein the second end of the flight core defines a trapezoidal shape.

15. The chain link assembly of claim 12, wherein the flight core defines a core length, and wherein the coating defines a coating length greater than the core length.

16. The chain link assembly of claim 12, wherein the flight core is a first flight core and the coating is a first coating, and wherein the chain flight assembly further comprises:
- a second flight core having a first end and a second end, the first end defining at least one surface secured to the second end of each flight pin and spaced apart from each side plate; and
- a second coating encapsulating the second flight core and at least a portion of the flight pins proximate the second flight core.

17. The chain link assembly of claim 12, wherein the flight core has a portion positioned between the flight pins and an end surface facing toward the side plates, the end surface being covered by the coating.

* * * * *